(12) United States Patent
Salvaji et al.

(10) Patent No.: US 8,867,743 B1
(45) Date of Patent: Oct. 21, 2014

(54) ENCRYPTION OF LARGE AMOUNTS OF DATA USING SECURE ENCRYPTION METHODS

(71) Applicant: MGM Resorts International, Las Vegas, NV (US)

(72) Inventors: Rajeshwar Salvaji, Henderson, NV (US); Mudit Chandra, Henderson, NV (US)

(73) Assignee: MGM Resorts International, Las Vegas, NV (US)

( * ) Notice: Subject to any disclaimer, the term of this patent is extended or adjusted under 35 U.S.C. 154(b) by 0 days.

(21) Appl. No.: 14/079,493

(22) Filed: Nov. 13, 2013

(51) Int. Cl.
*H04L 9/00* (2006.01)
*H04L 9/28* (2006.01)
*H04L 9/18* (2006.01)

(52) U.S. Cl.
CPC ... *H04L 9/28* (2013.01); *H04L 9/18* (2013.01)
USPC .......................................... 380/260; 380/262

(58) Field of Classification Search
CPC ............... H04L 9/12; H04L 9/16; H04L 9/18; H04L 9/28
USPC .................. 380/260, 262, 268, 28, 46; 705/64
See application file for complete search history.

(56) References Cited

U.S. PATENT DOCUMENTS

| | | | |
|---|---|---|---|
| 5,343,526 A * | 8/1994 | Lassers | 705/59 |
| 7,240,209 B2 | 7/2007 | Carro | |
| 8,360,313 B1 * | 1/2013 | Leon et al. | 235/381 |
| 2001/0007975 A1 | 7/2001 | Nyberg et al. | |
| 2003/0130955 A1 * | 7/2003 | Hawthorne | 705/65 |
| 2004/0236953 A1 * | 11/2004 | Merenne et al. | 713/182 |
| 2006/0053112 A1 * | 3/2006 | Chitkara et al. | 707/9 |
| 2008/0189554 A1 * | 8/2008 | Ali et al. | 713/189 |
| 2009/0083545 A1 | 3/2009 | Heim et al. | |
| 2010/0011423 A1 | 1/2010 | Isobe et al. | |
| 2010/0158242 A1 | 6/2010 | Asher | |
| 2010/0211787 A1 * | 8/2010 | Bukshpun et al. | 713/170 |
| 2011/0078779 A1 * | 3/2011 | Liu et al. | 726/9 |
| 2012/0214577 A1 | 8/2012 | Petersen et al. | |

OTHER PUBLICATIONS

Oracle, Oracle Database, Advanced Security Administrators Guide, 11g Release 1 (11.1), Chapter 3, "Securing Stored Data Using Transparent Data Encryption", Jul. 2012.*
U.S. Appl. No. 14/079,519; Office Action mailed Jan. 24, 2014.

* cited by examiner

*Primary Examiner* — Samson Lemma
(74) *Attorney, Agent, or Firm* — Lewis Roca Rothgerber LLP

(57) ABSTRACT

Information is encrypted using randomly generated information, a multiple step process, and additional secured logic. Upon receiving a credit card authorization request with a credit card number (or other sensitive or valuable information), the present technology may randomly select an encryption key from a set of encryption keys. A randomly generated encryption index may then be generated. The credit card number may then be encrypted using the encryption key a number of times as indicated by the randomly generated index. A cryptographic salting key may be selected from a set of cryptographic salting keys and salting modification logic may be accessed. The selected salting key may then be applied to the encrypted credit card number. After the salting, the salting modification logic may be applied to the salted encryption string.

15 Claims, 7 Drawing Sheets

ENCRYPTION OF LARGE AMOUNTS OF DATA USING SECURE ENCRYPTION METHODS

REFERENCE TO RELATED APPLICATIONS

The present application is related to U.S. patent application Ser. No. 14/079,519, titled "Storing Secure Information Using Hash Techniques," filed on Nov. 13, 2013, the disclosure of which is incorporated herein by reference.

BACKGROUND

Businesses that offer services to large numbers of people often have access to large amounts of sensitive information. For example, many businesses perform thousands or millions of credit card transactions each year. Credit card information is just one example of sensitive information that many companies handle as part of providing a service.

Currently existing methods for protecting large amounts of sensitive information have disadvantages. Typically, when the information includes millions of records, the method of protection includes applying a quick and single step transformation to each piece of information. This allows the information to be quickly transformed into a secure state and allows for quickly returning the transformed data to its original state. The disadvantage of this method is that the single step transformation is not secure. With the development of more powerful computing systems and increasing market for illegal sales of sensitive information, there is opportunity and reward for people who can breach existing security measures and get access to businesses sensitive information.

It is important for businesses to be able to protect large amounts of sensitive information such as credit card information while still being able to access the information when needed.

SUMMARY

The present technology securely encrypts information using randomly generated information, a multiple step process, and additional secured logic. Upon receiving one or more credit card authorization requests with a credit card number (or other sensitive or valuable information), the present technology may randomly select an encryption key from a set of encryption keys. For example, the set of encryption keys may include over one hundred keys. A cryptographic salting key may be selected from a set of cryptographic salting keys. Logic may then be applied to the salting key by an application. The logic-modified salting key and randomly selected encryption key is applied to the credit card by providing both keys to an encryption function. The encrypted credit card is then stored.

In an embodiment, a method receiving a string of information may randomly select an encryption key from a plurality of encryption keys. An index may also be selected for the encryption. A cryptographic salting key may be selected and logic to modify the salting key may be accessed. The string of information may be encrypted using the encryption key, index, salting key and logic.

In embodiments, the method described above may be performed by systems including application servers and data stores. Additionally, one or more modules stored on memory may be executable by one or more processors to perform the above method.

DETAILED DESCRIPTION

The present technology securely encrypts information using randomly generated information, a multiple step process, and additional secured logic. Upon receiving credit card authorization request with a credit card number (or other sensitive or valuable information), the present technology may randomly select an encryption key from a set of encryption keys. For example, the set of encryption keys may include over one hundred keys. A cryptographic salting key may be selected from a set of cryptographic salting keys. The selected salting key may be modified by application logic. The salting logic may be stored within and applied by an application. The credit card number may be encrypted using an encryption function that receives the modified salting key and the randomly selected encryption key. The encrypted credit card may be stored with information concerning the randomly selected key and salting. For example, the encrypted credit card number may include a string to which the additional information may be appended or added.

The encryption may be used to protect large amounts of sensitive data such as credit card numbers used by businesses. By randomly generating encryption keys and other information, and applying the randomly selected keys and application logic which is stored separately from the keys, the encrypted credit card number is much harder to decrypt by unauthorized entities. As such, the encryption methodology may be very useful for several purposes. For example, credit card numbers received and processed by a casino, other hospitality business, retail business, financial institution or other business may be encrypted by the process of the present technology and securely stored for long periods of time with reduced fears of access by unauthorized entities.

Though the present technology may be discussed herein with respect to credit card numbers and casinos, other information may be encrypted using techniques and systems described herein for entities other than casinos.

Figure 1:
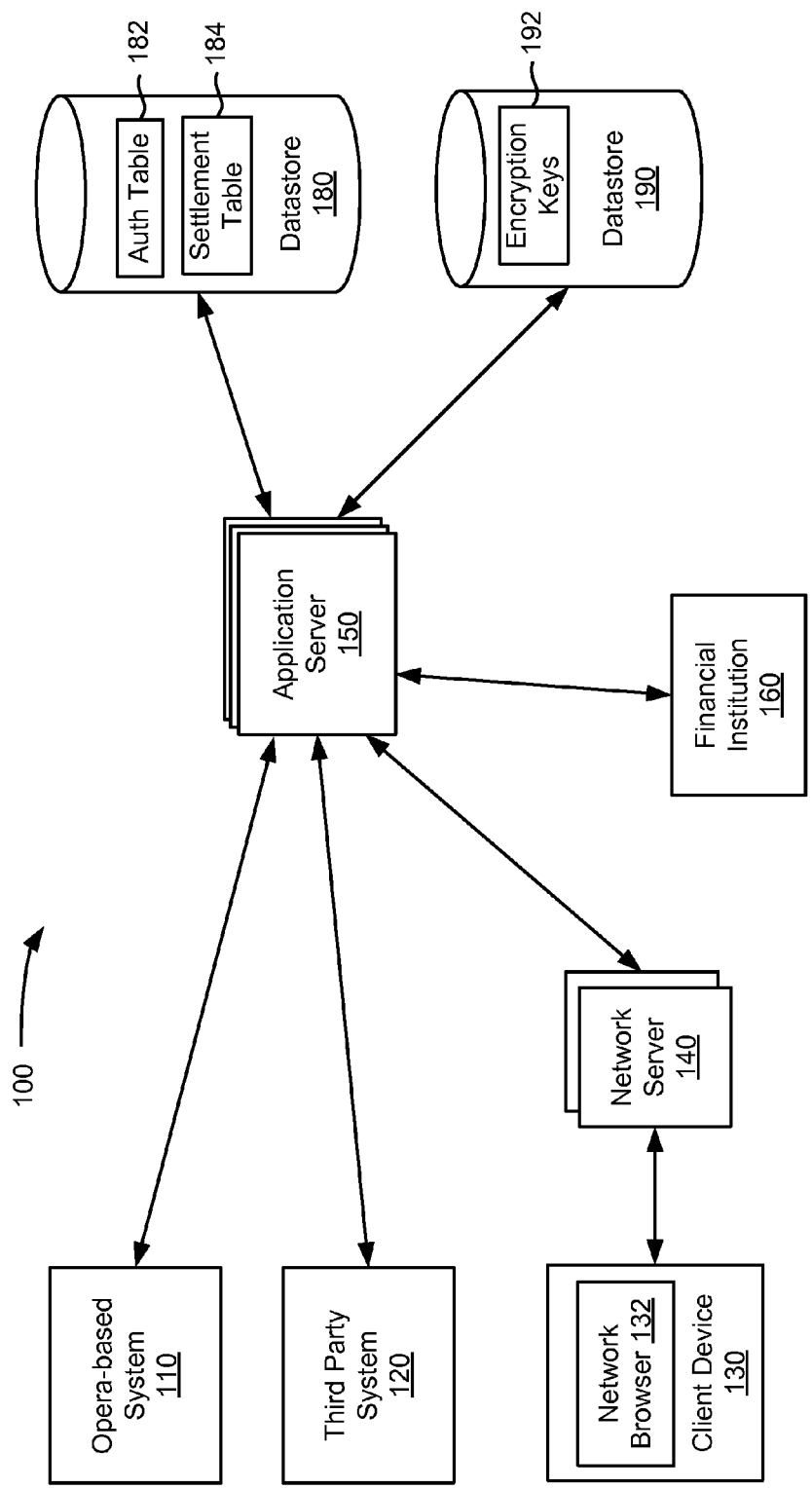
FIG. 1 illustrates a system for encrypting information.

FIG. 1 illustrates a system for encrypting information. System 100 of FIG. 1 includes OPERA-based remote system 110, third party remote system 120, client device 130, network server 140, application server 150, financial institution 160, database 180, and database 190.

Each of systems 110-120, client device 130, servers 140-150, systems 160-170, and data stores 180 and 90 may communicate over one or more networks. The networks may be any network suitable to facilitate communication of data between different servers, devices and machines. The one or more networks may be implemented as a private network, public network, intranet, the Internet, a cellular network, Wi-Fi network, VoIP network, or a combination of one or more of these networks.

Each of servers 140 and 150 and data stores 180-190 may be implemented as one physical machine or multiple physical machines. The servers and data stores may be implemented as logically separate servers and data stores or combined into fewer logical servers and data stores than those illustrated in system 100.

OPERA based system 110 may include one or more systems for communicating reservations with application server 150. For example, the system 110 may be implemented by an external business that sends reservation requests with credit card numbers to application server 150.

Third party remote system 120 may also communicate sensitive information such as credit card numbers to application server 150. For example, when application server 150 is implemented by a casino, the third party remote system 120 may be implemented by a partner such as a restaurant, event ticketing service, or other service which may transmit sensitive information to the casino.

Client device 130 may communicate with application server via one or more network servers 140. Client device 130 may be implemented as any computing device which may communicate or be configured to communicate over a network, such as for example a laptop, desktop, workstation, smart phone, tablet computer or other computing device. Client device 130 may include a network browser 132 through which the client may communication with a network service provided by server 150. Network browser 110 may be a client application for viewing content provided by an application server, such as application server 150, via network server 140.

Network server 140 may receive and process requests received from client device 130 and sent by application server 150. When a network of communication is the Internet, network server 125 may be implemented as one or more web server. In some embodiments, network server 125 and application server 130 may be implemented as a single server, or include multiple machines that each implement a network server and an application server.

Application server 150 may communicate with network systems 110-120, client device 130, network servers 140, systems 160-170, and data stores 180-190. Application server 130 may also communicate with other machines and devices (not illustrated in FIG. 1). Application server 130 may host an application, one or more portions of a distributed application and other software modules that may be executed to perform the functionality discussed herein.

Application server 150 may include one or more applications that may encrypt information such as credit card information, perform a hash on information such as a credit card number, and perform other features discussed herein. When performing an encryption, keys for the encryption and other data may be stored at server 160 or remotely at data stores 180-190. An application on application server 150 may access keys, an index associated with an encryption key, salting information and other logic for performing an encryption on data received remotely. Once encrypted or a hash is performed, the results may be stored remotely at database 170.

Data store 180 may include an authorization table 182, settlement table 184 and other data. Data store 180 may modify, add, delete and generate the tables based on instructions received from application server 150 and other sources. Data store 192 may include encryption keys 192. The encryption keys may include primary encryption process keys such as keys used for advanced encryption standard (AES) encryption and salting keys.

Though illustrated as remote machines to application server 150, databases 160 and 170 may each or both be stored locally, for example as logically separate data stores, on application server 150.

Application server 150 may receive settlement requests and authorization requests from services 110 and 120 and may periodically send a batch of the settlements to financial institution 160. The batch settlements may be sent using FTP protocol or some other protocol to financial institution 190. In some embodiments, the batch of settlements may be sent daily, monthly, or based on some other event.

Figure 2:
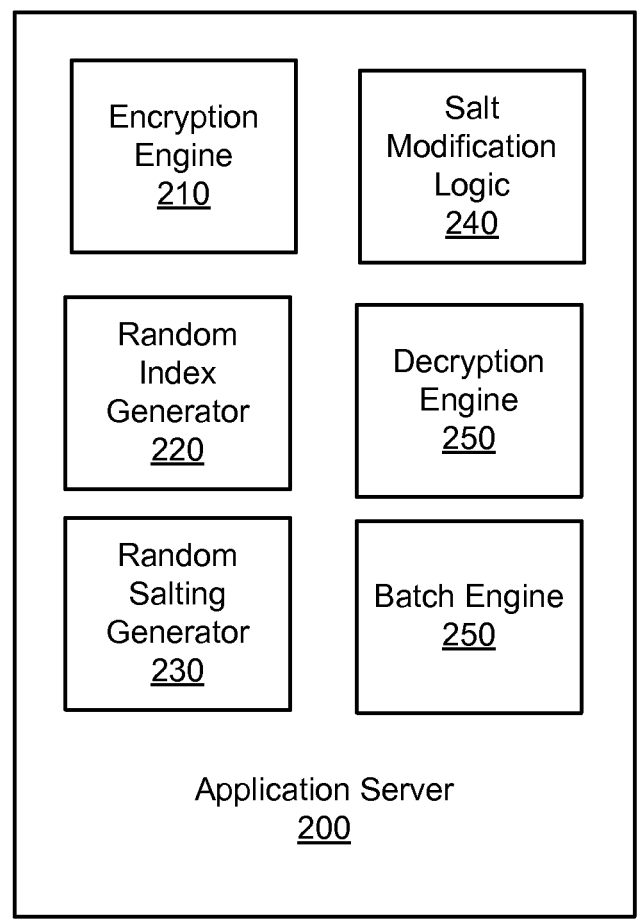
FIG. 2 illustrates a block diagram of an application server.

FIG. 2 illustrates a block diagram of an application server 150. Application server 150 includes executable modules of encryption engine 210, random index generator 220, random salting generator 230, salt modification logic 240, decryption engine 250, and batch engine 250. Encryption engine 210 may implement an encryption function and/or methodology on information received from an external service. For example, when a third party service 110 or 120 sends an authorization request to application server 150 which includes a credit card number, encryption engine 210 may encrypt the credit card number using AES techniques. Encryption engine may randomly select one of multiple encryption keys from data store 170 to be used when encrypting information or select an encryption key associated with an index generated by random index generator 220.

Random index generator 220 may randomly generate an index associated with an encryption key. Each of a plurality of unique encryption keys may be associated with a corresponding unique index. The index may be randomly selected by generator 220, and the encryption key may be used by engine 210 to encrypt data.

In addition to traditional encryption, a salt process may be performed in addition to encryption involving an encryption key and index. Random salting generator 230 may randomly select a salting key to apply to a string such as a credit card string (or other input information). Salt modification logic 240 may further modify the salt key applied by the encryption engine. Salt modification logic 240 may, for example, specify selected values in a salt key to replace with other values. The logic 240 may be contained within and applied by an application rather than be stored and accessible elsewhere within the system of FIG. 1.

Decrypting engine 250 may decrypt an encrypted string based on the random index generator data, the random salt generator data, the encryption engine key used by encryption engine 210, and the salt modification logic 240.

Batch engine 260 may retrieve decrypted information and send the decrypted information as a batch of settlements to financial institution 160.

Figure 3:
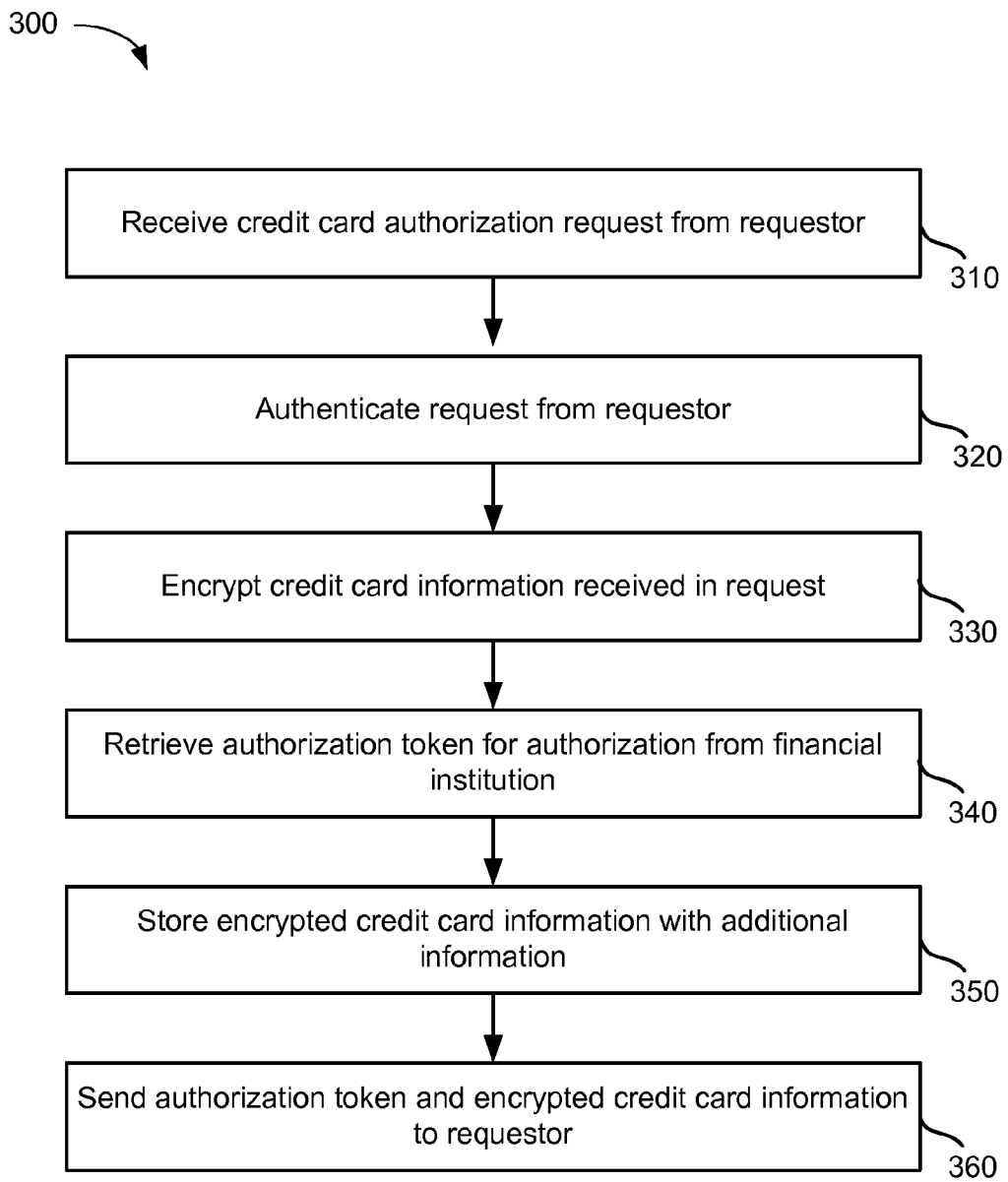
FIG. 3 illustrates a method for storing encrypted credit card information.

FIG. 3 illustrates a method for processing an authentication request. First, a credit card authorization request is received from a requestor at step 410. The authorization request may include the credit card itself, an amount to be authorized, and other information for the credit card such as a user name and an expiration date for the credit card. The request may be authenticated at step 420. Authentication is performed to ensure the request is received from a reliable source. A reliable source may be identified by recognizing an IP address from which the authorization request is received, detecting a code placed in a header of the request, or other methods. The code may be associated with a particular source and provided to the requestor by the administrator of application server 150.

Once the request is authenticated, the credit card information is encrypted at step 430. The credit card may be encrypted using a multi-step randomly generated encryption process. More information regarding encrypting a credit card is discussed below with respect to the method of FIG. 5.

An authorization token may be retrieved from a financial institution at step 340. An authorization request with credit card information and a desired may be sent to financial institution 160. In response, financial institution 160 may approve the request and send an authorization token, deny the request, or provide other information. Assuming the request is approved, the authorization token is sent in the financial institutions response to application server 150.

The encrypted credit card information is stored with additional information at step 350. The additional information may include the authorization token as well as information which may be used to decrypt the credit card number. For example, the additional information may include a particular key (or index to the particular key) used to encrypt the card, an index generated for the encryption key, a salt key or index to the salt key, and other information. When stored, the encrypted information may be associated and stored with the authentication token as well as an identifier. The identifier may be generated using a hashing method. An exemplary hashing method is discussed in U.S. patent application Ser. No. 14/079,519, titled "Storing Secure Information Using Hash Techniques," filed on Nov. 13, 2013, concurrently with the present application.

The authentication token and the encrypted string generated from the credit card may be transmitted to the requesting party that requested the authorization request at step 360.

Figure 4:
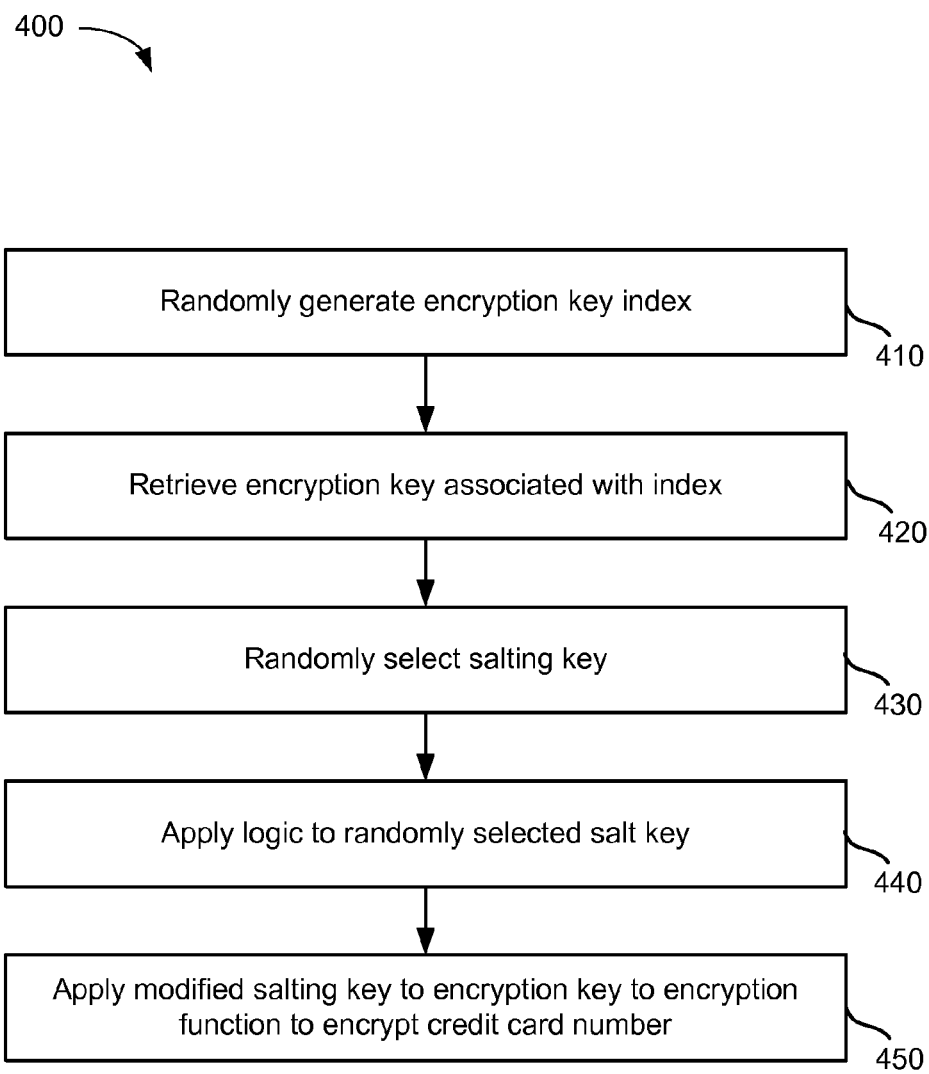
FIG. 4 illustrates a method for encrypting information.

FIG. 4 is a method for encrypting information. In some embodiments, the method of FIG. 4 may be used to encrypt credit card numbers and provides more detail for step 330 in the method of FIG. 3. First, an encryption key index may be randomly selected from a set of indexes associated with encryption keys at step 410. Each of a plurality of unique indexes may be associated with a unique encryption key. For example, one unique index may be associated with one encryption key for each of one hundred encryption keys. The encryption key associated with the randomly selected index is retrieved at step 420. The encryption key may be stored at a different location than that at which the credit card numbers are ultimately stored.

A salting key is selected at step 430. The salt key may be randomly selected from a plurality of salting keys.

Logic may be applied to the salt key at step 440. The modification logic may adjust, replace or otherwise modify one or more characters in the salt key. For example, select key characters such as the third, seventh and tenth digit may be replaced by other characters as specified by the logic. The logic 240 that modifies the salted credit card string may be contained within and applied by an application rather than be stored and accessible elsewhere within the system of FIG. 1.

The modified salt key and the randomly selected encrypted key are applied to the credit card number at step 450. The encryption may include applying modified salt key and encryption key to an Advanced Encryption Standard (AES) function to encrypt the credit card string. Once encrypted, the encrypted string is stored as discussed with respect to step 350 of the method of FIG. 3.

Figure 5:
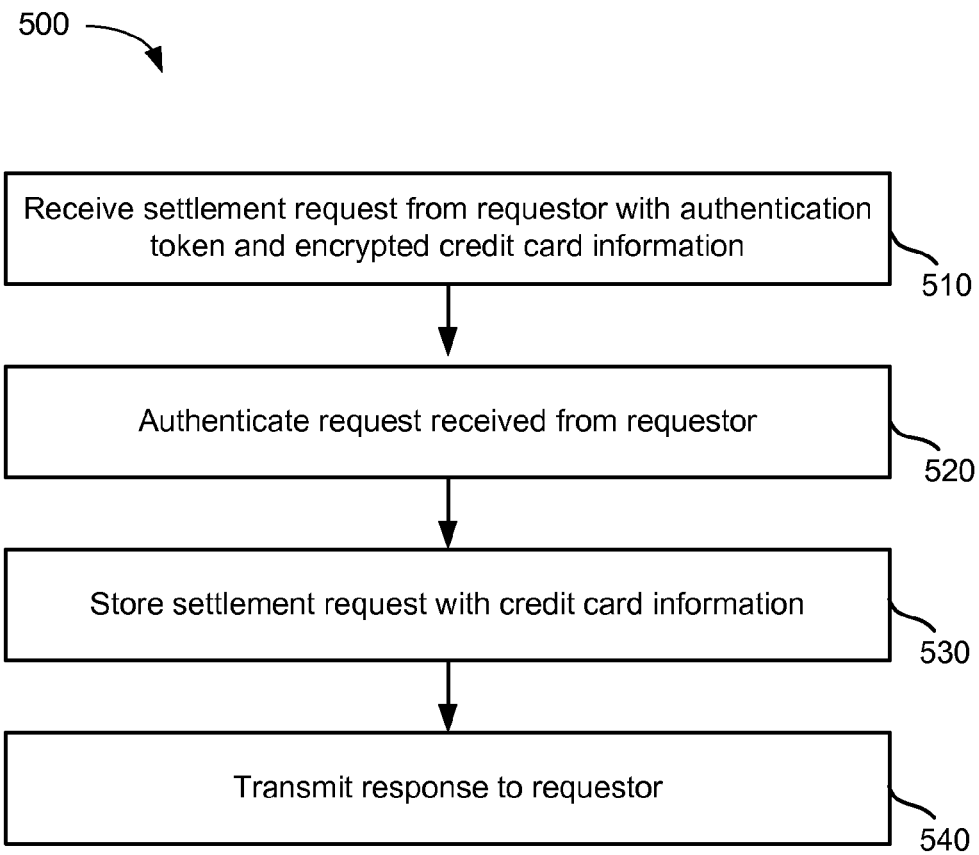
FIG. 5 illustrates a method for processing a settlement request.

FIG. 5 is a method for processing a settlement request. First, a settlement request is received at step 510. The settlement request may include an authentication token and encrypted credit card information, for example the result of the encryption process discussed with respect to FIG. 4. The settlement request may be authenticated at step 520. The request may be authenticated based on an IP address of the requestor, a code or other information included in the request header or other portion of the request, or in some other manner.

The settlement request may be stored at step 530 at step 520. The settlement request may be stored in table of settlement request along with the encrypted credit card data and an index. The index may be generated by hashing the credit card number or some other index generation technique. A response to the settlement request is generated and transmitted to the requestor. The response may confirm the request receipt as well the status of the request.

Figure 6:
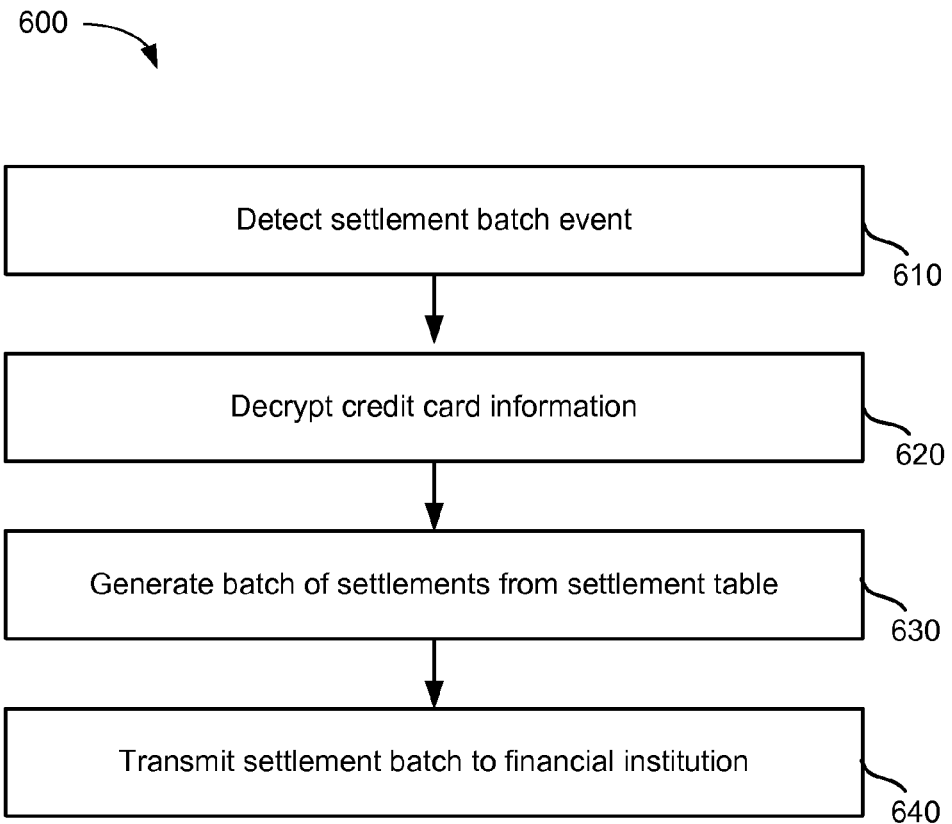
FIG. 6 illustrates a method for processing a batch of settlements.

FIG. 6 illustrates a method for processing a settlement batch. First, a settlement batch event is detected at step 610. The event may be associated with a trigger that occurs on a daily basis, an event such as the accumulation of a certain number of settlements, a request from a financial institution, a user request to send the settlements, or some other event. Upon detecting a settlement batch event, credit card information is decrypted along with other information from the settlement table at step 620. A batch of settlements is then created from the decrypted credit cards and other settlement information at step 630. The generated batch is then transmitted to financial institution 160 from the application server 150 at step 640. The financial institution 160 may send a response to the application server to confirm that the batch was received. The batch may be sent in any number of protocols per the financial institution interface, such as for example using FTP protocol.

Figure 7:
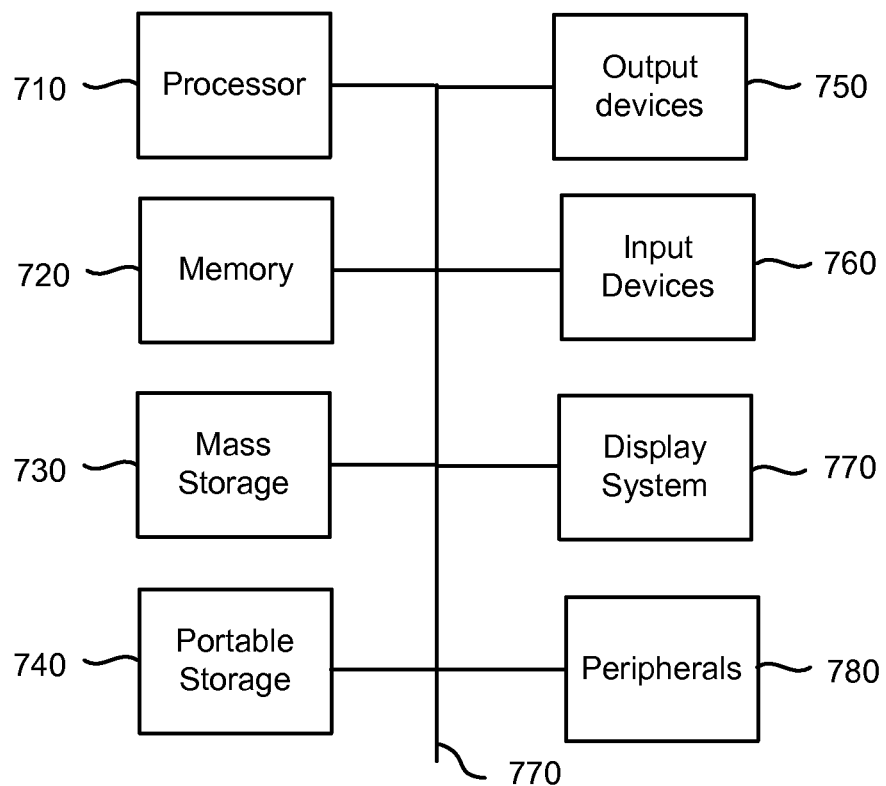
FIG. 7 illustrates a computing environment for implementing the present technology.

FIG. 7 is a block diagram of an exemplary computing system for implementing the present technology. System 700 of FIG. 7 may be implemented for computing devices such as the contexts of the likes of OPERA-based remote system 110, third party remote system 120, client device 130, network server 140, application server 150, financial institution 160, database 180, and database 190. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for encrypting data, comprising:
    receiving a string of information by an application stored in memory and executed on a server;
    randomly selecting by the application an encryption key from a plurality of encryption keys;
    selecting a cryptographic salting key;
    accessing logic to modify the salting key, wherein the logic includes replacing selected characters in the encrypted string with a value; and
    encrypting the string of information using the encryption key, modified salting key and logic by the application.

2. The method of claim 1, wherein the string of information includes a credit card number.

3. The method of claim 1, wherein encrypting the string of information includes:
    applying the salting key to the string;
    applying the logic to the string as modified by the salting key; and
    encrypting with the encryption key the string as modified by the salting key and the logic.

4. The method of claim 1, wherein the encryption key is selected based on a random selected index of a plurality of indexes, wherein index each corresponds to unique encryption key.

5. The method of claim 1, wherein the cryptographic salting key is selected randomly.

6. The method of claim 1, wherein the value is predetermined.

7. The method of claim 1, wherein the logic is implemented by an application.

8. The method of claim 1, further comprising storing the encrypted string.

9. The method of claim 8, wherein the encrypted string is stored with the randomly selected encryption key and the index.

10. The method of claim 9, wherein data associated with the randomly selected encryption key are stored as additional digits appended to the encrypted string.

11. The method of claim 8, wherein the plurality of encryption keys are at stored at a first server and the encrypted string is stored at a second server.

12. The method of claim 1, wherein the string of information is received and encrypted by a casino.

13. The method of claim 1, wherein the string of information includes a credit card received as payment by an external business.

14. A non-transitory computer readable storage medium having embodied thereon a program, the program being executable by a processor to perform a method for encrypting data, the method comprising:
    receiving a string of information;
    randomly selecting an encryption key from a plurality of encryption keys;
    selecting a cryptographic salting key;
    accessing logic to modify the salting key, wherein the logic includes replacing selected characters in the encrypted string with a value; and
    encrypting the string of information using the encryption key, modified salting key and logic.

15. A system for encrypting data, comprising:
    a processor;
    memory; and
    one or more software modules stored in the memory and executed by the processor to receive a string of information, randomly select an encryption key from a plurality of encryption keys, select a cryptographic salting key, access logic to modify the salting key, wherein the logic includes replacing selected characters in the encrypted string with a value, and encrypt the string of information using the encryption key, modified salting key and logic.

* * * * *